United States Patent
Long, Jr.

[11] 4,450,943
[45] May 29, 1984

[54] HELICAL SPLINE CLUTCH PLATE SEPARATOR

[75] Inventor: Thomas F. Long, Jr., Maidenhead, England

[73] Assignee: Dana Corporation, Toledo, Ohio

[21] Appl. No.: 341,436

[22] Filed: Jan. 21, 1982

[51] Int. Cl.³ .................. F16D 13/52; F16D 25/063
[52] U.S. Cl. ........................ 192/70.2; 192/70.28; 192/85 AA; 192/88 A; 192/101
[58] Field of Search ................. 192/54, 70.2, 70.28, 192/85 A, 85 AA, 88 A, 101; 188/71.5, 723

[56] References Cited

U.S. PATENT DOCUMENTS

| | | |
|---|---|---|
| 1,832,527 | 11/1931 | Brown . |
| 3,157,057 | 11/1964 | Palmer et al. ............... 192/70.12 |
| 3,435,936 | 4/1969 | Warman . |
| 3,726,373 | 4/1973 | Miller ........................ 192/35 |
| 3,730,314 | 5/1973 | Herr et al. ................... 192/54 |
| 3,782,516 | 1/1974 | Frisby et al. ............... 192/85 AA |
| 3,789,966 | 2/1974 | Miller ........................ 192/35 |
| 4,274,523 | 6/1981 | Sigg .......................... 192/67 A |

Primary Examiner—Rodney H. Bonck
Assistant Examiner—James J. Merek
Attorney, Agent, or Firm—Fraser, Barker, Purdue & Clemens

[57] ABSTRACT

A low drag air clutch for use in power transmission systems includes a rotating housing containing a clutch plate, a pair of spaced apart friction disks disposed on opposite faces of the clutch plate and a pneumatic operator assembly. One of the friction disks is fixedly retained in the housing. The other is coupled to the housing through arrays of helical splines which permit limited axial and rotational movement. The pneumatic operator assembly is disposed adjacent, engages and axially translates the movable friction disk. The clutch plate is coupled to a shaft member through arrays of helical splines. Activation of the pneumatic assembly engages the clutch elements. When deactivated, the rotation of the clutch elements and contact therebetween causes the helical spline arrays to urge the clutch plate and friction disks apart in order to eliminate partial mechanical coupling, i.e., drag, through the clutch.

14 Claims, 5 Drawing Figures

HELICAL SPLINE CLUTCH PLATE SEPARATOR

BACKGROUND OF THE INVENTION

The invention relates generally to clutch mechanisms for the selective transmission of rotary energy and more particularly to clutch mechanisms which eliminate or substantially reduce partial coupling, i.e., drag, between the input and output members when the clutch is disengaged.

Clutch mechanisms provide selective transmission of rotary energy over a broad range of power transfer capabilities. In addition to the basic parameter of power transfer capability, such considerations as overall size, cost, service life and serviceability dictate the ultimate design of any particular clutch. Single or dual faced plate type clutch mechanisms such as disclosed in U.S. Pat. No. 1,832,527 and multiple disk clutches which contain a plurality of interleaved clutch plates such as the device disclosed in U.S. Pat. No. 987,945 represent but two of many general styles of clutch design. Mechanically activated clutches such as disclosed in either of the above recited patents or fluid or air actuated clutches such as those disclosed in U.S. Pat. Nos. 2,799,375, 3,435,936, or 3,782,516 illustrate two other clutch classifications.

A difficulty common in many clutch mechanisms, especially those incorporating plural clutch elements, centers on achieving positive and total mechanical isolation of the input and output components when the clutch is deactivated. Stated differently, the residual coupling or drag between the input and the output components of a deactivated clutch is undesirable. First of all, such residual coupling or drag may increase standby or idle power requirements and thus reduce overall efficiency, especially in a mechanical system where the clutch is deactivated and the prime mover idles for a significant portion of the operating cycle. Secondly, positive disconnection will typically improve the life of the clutch inasmuch as reduced scrubbing and sliding of the clutch elements against one another during idle and thus reduce both the generation of frictional heat and consequently overall operating temperatures.

SUMMARY OF THE INVENTION

The instant invention comprehends a low drag air clutch having a generally circular housing within which are disposed a clutch plate, a pair of spaced apart friction disks disposed on opposite sides of the clutch plate and a pneumatic operator assembly suitable for applying force to the disks and plate and providing frictional engagement therebetween. One of the friction disks is fixedly retained within and rotates with the housing. The other friction disk is movable and is coupled to the housing through interengaging sets of helical splines, preferably disposed about its periphery. Mating splines are disposed in a complementary fashion within the housing and permit limited axial and rotational movement. The clutch plate is disposed between the fixed and movable friction disks and is mounted upon a rotatable member by interengaging sets of helical splines. The pneumatic operator assembly comprises a circular bladder or similar device and a spring biased pressure plate which is operably coupled to and axially translates the movable friction disk and clutch plate. The housing itself preferably functions as the input drive member and the member upon which the clutch plate is disposed functions preferably as the output member.

When compressed air is supplied to the pneumatic operator assembly, the movable friction disk is forced against the clutch plate and the clutch plate in turn is forced into fricitional engagement with the fixed friction disk thereby transferring rotational energy from the input member and housing to the output member. Releasing compressed air from the operator assembly relieves the compressive force against the clutch components and power transmission substantially ceases. The spring biased pressure plate ensures collapse of the pneumatic operator. Separation of the clutch plate from each of the friction disks is ensured by the action of the sets of helical splines. The sense of the splines, either left handed or right handed, is selected such that continuing rotation of the drive housing, particularly any relative rotation greater than that of the friction disk mounted upon the helical splines, causes the friction disk to back away from the clutch plate. This axial motion occurs primarily when the friction disk rubs against the clutch plate and is thus urged to rotate at a speed lower than the speed of the housing. In a similar manner, the helical spline interconnection between the clutch plate and the output member axially translates the clutch plate away from the fixed friction disk secured to the housing toward the movable friction disk if minimal contact and speed differences occur. In their deactivated state, the clutch elements will be urged into axial positions wherein certain minimum spacings will exist therebetween and drag will be either eliminated or reduced to a negligible level. It should be understood that the sense of the helical splines must be selected to match, first of all, the direction of rotation of the clutch as will be fully described subsequently.

Therefore it is an object of the instant invention to provide a selective power transmission device which exhibits negligible input to output coupling when in a deactivated state.

It is a further object of the instant invention to provide an air operated clutch which exhibits low drag in a deactivated state.

It is a still further object of the instant invention to provide a low drag, air operated clutch having clutch elements disposed for limited axial translation on sets of helical splines.

It is a still further object of the instant invention to provide a low drag, air operated clutch having components interconnected by helical spline sets.

It is a still further object of the instant invention to provide a low drag, air operated clutch mechanism which is both compact and of straightforward, easy to manufacture design.

Still further objects and advantages of the instant invention will become apparent by reference to the following description and appended drawings.

DESCRIPTION OF THE PREFERRED EMBODIMENT

Figure 1:
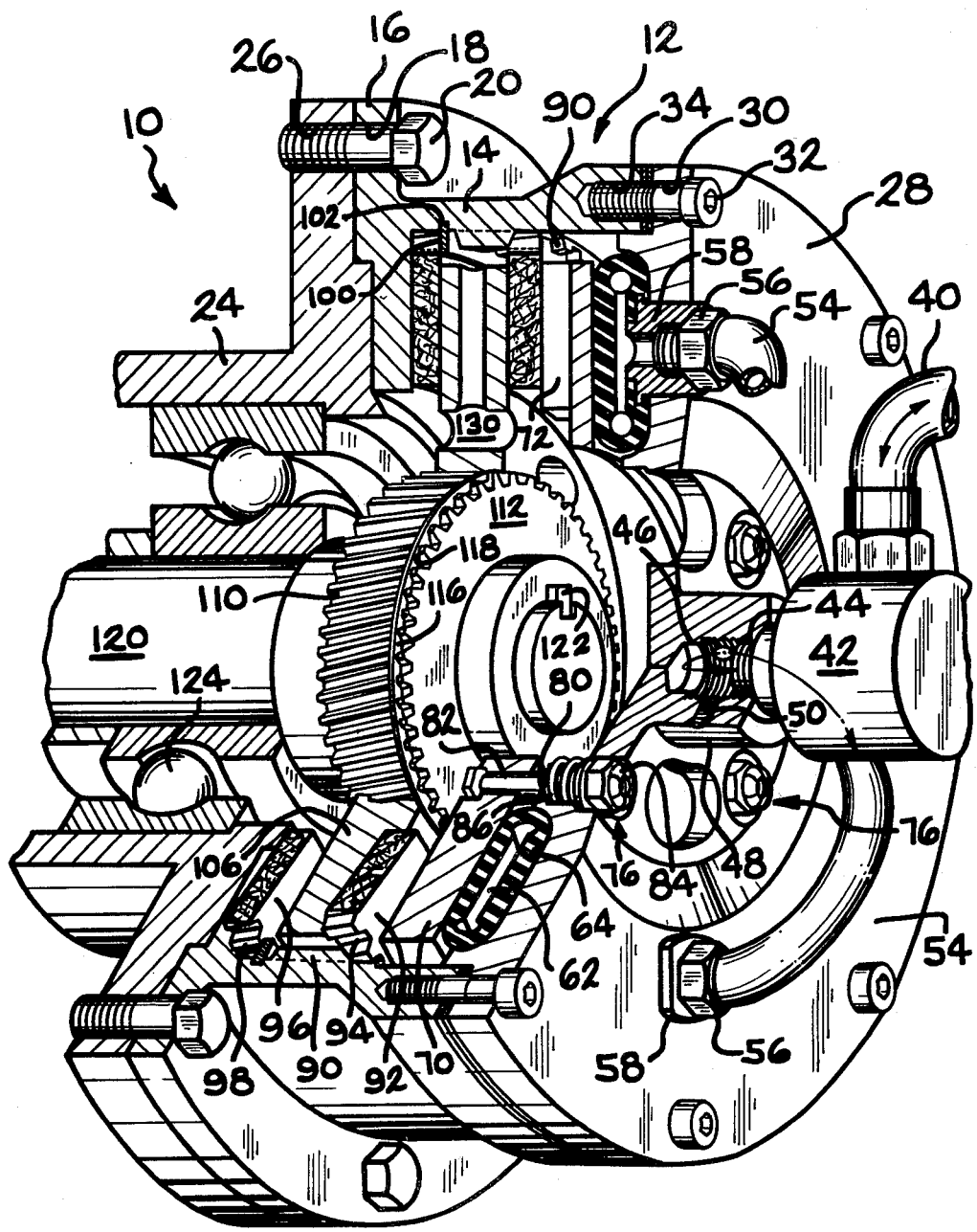
FIG. 1 is a perspective view in partial section of a low drag clutch according to the instant invention.

Referring now to FIG. 1, a low drag clutch mechanism according to the instant invention is illustrated and generally designated by the reference numeral 10. The clutch mechanism includes a generally circular housing assembly 12 which receives and supports the other components of the clutch mechanism 10 in proper operating relationship. The housing assembly 12 comprises a centrally disposed annulus 14 having a radially extending flange 16 formed integrally therewith. The radially inwardly directed portion of the flange 16 serves to retain other components of the clutch mechanism 10 as will be subsequently described. The radially outwardly directed portion of the flange 16 includes a plurality of equally circumferentially spaced apart openings 18 through which a like plurality of threaded fasteners such as bolts 20 may be utilized to secure a suitably flanged input or drive member 24 having threaded openings 26 to the clutch mechanism 10 in a conventional manner. Disposed adjacent the opposite end of the annulus 14 is a circular cover plate 28. The cover plate 28 defines a plurality of openings 30 disposed in equally spaced apart relationship about its periphery through which threaded fasteners 32 extend into complementarily threaded passageways 34 in the annulus 14 to secure the cover plate 28 to the annulus 14 in a coventional manner.

Compressed air is supplied to the rotating clutch mechanism 10 through a supply line 40 and a rotating union 42. The rotating union 42 provides an interconnection between the stationary air supply line 40 and the rotating clutch mechanism 10 and is a conventional component of pneumatic clutch art as those skilled in this art will readily appreciate. The rotating union 42 is secured by suitable interengaging male and female threads 44 and 46, respectively, to a centrally disposed hub 48 which defines a pair of threaded outlet passageways 50. The threaded passageways 50 receive suitable complementarily threaded fittings (not illustrated) which are terminating components of a like number of air lines 54. The opposite ends of air lines 54 are likewise terminated by suitable threaded fittings 56 which are received in complementarily threaded inlet fittings 58. The inlet fittings 58 communicate with an interior chamber 62 of a circular air bladder 64 fabricated of an elastomeric, resilient material.

Figure 2:
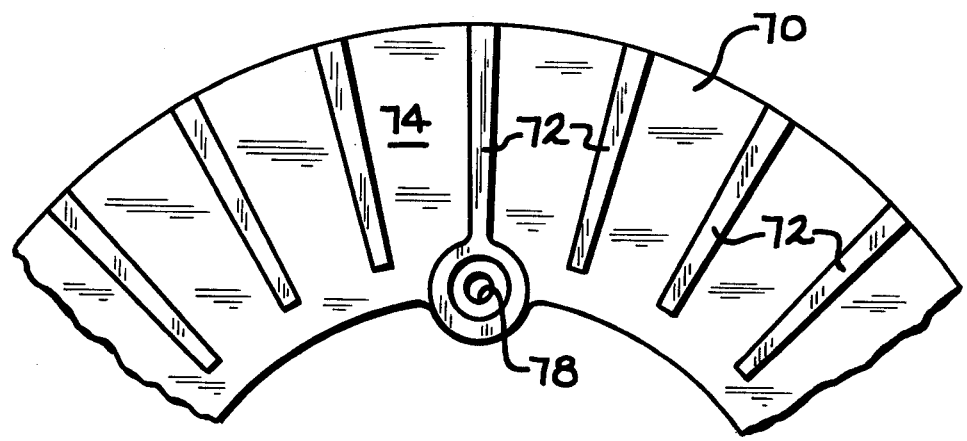
FIG. 2 is a fragmentary elevational view of a ribbed pressure plate of a low drag clutch according to the instant invention.

Referring now to FIGS. 1 and 2, a ribbed, radially extending pressure plate 70 is disposed axially adjacent the face of the air bladder 64 opposite the cover plate 28. The pressure plate 70 defines an array of radially disposed, spaced apart ribs 72. The ribs 72 both improve thermal isolation between the air bladder 64 and other components of the clutch mechanism 10 and define radially extending channels 74 through which a flow of cooling air may pass. A plurality of mounting assemblies 76 disposed uniformly about the axis of the ribbed clutch plate 70 provide limited, spring biased axial travel while radially positioning and supporting the pressure plate 70 on the cover plate 28. Each of the mounting assemblies 76 is disposed between axially aligned apertures 78 and 80 defined by the ribbed pressure plate 70 and cover plate 28, respectively, and includes an elongate fastener such as a threaded bolt 82, a locking nut 84, and a compression spring 86 disposed between the outer face of the cover plate 28 and the locking nut 84. The mounting assemblies 76 cooperate with the air bladder 64 to provide bi-directional axial translation of the ribbed pressure plate 70 in a conventional manner; pressurization of the air bladder 64 translating the ribbed pressure plate 70 away from the cover plate 28 and depressurization of the air bladder 64 resulting in translation of the ribbed pressure plate 70 toward the cover plate 28 due to the bias provided by the compression springs 86.

Referring again to FIG. 1, the inner surface of the annulus 14 defines an array of helical splines 90. The female splines 90 extend axially from a region adjacent the ribbed pressure plate 70 to the inwardly directed portion of the flange 16 and may be of any suitable profile, such as the buttress profile illustrated. A first friction disk 92 is disposed generally axially adjacent the ribbed pressure plate 70 and includes a complementary array of helical splines 94 disposed about its periphery. The first friction disk 92 may be fabricated of any suitable clutch facing material, material which will be dictated by the intended application of the clutch mechanism 10 as those skilled in the art will readily understand. A second friction disk 96 of identical construction having an array of peripherally disposed helical splines 98 is disposed within the annulus 14 adjacent the inwardly directed portion of the flange 16. The second friction disk 96 is fixedly retained in contact with the inwardly directed portion of the flange 16 by a retaining ring 100 which is received within a circumferential groove 102 and the splines 98 engage the splines 90 on the inside of the annulus 14.

Figure 3:
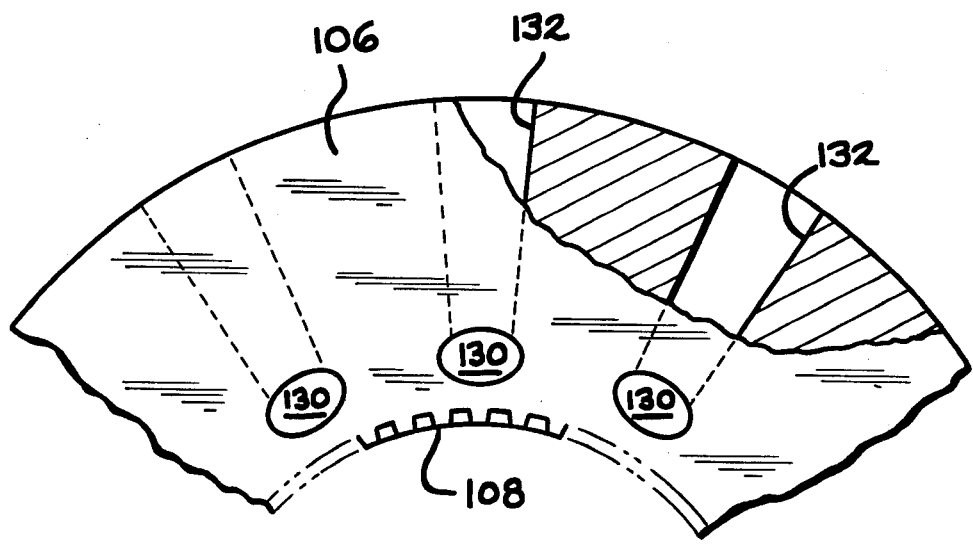
FIG. 3 is a fragmentary elevational view with portions broken away of the clutch plate of a low drag clutch according to the instant invention.

Referring now to FIGS. 1 and 3, the clutch mechanism 10 also includes a movable clutch plate 106 which is positioned ganerally between the first and second friction disks 92 and 96. The movable clutch plate 106 inclues an array of helical splines 108 which engage a complementary array of helical splines 110 which are disposed about the periphery of a hub 112. A retaining ring 116 is seated within a complementarily sized groove 118 defined by the helical splines 110. The movable clutch plate 106 thus rotates with the hub 112 and may translate axially between the second friction disk 96 and the retaining ring 116. The hub 112 is secured to a drive shaft 120 through suitable means such as a key 122 and the shaft 120 is rotatably supported within the flanged drive member 24 by means of suitable anti-friction bearings such as the ball bearing 124. As shown in FIG. 3, the movable drive plate 106 defines a plurality of through axial openings 130. The axial openings 130 are disposed in a generally circular, spaced apart arrangement and communicate with a like number of radially disposed passageways 132. The axial openings 130 and radial passageways 132 provide a flow path for air which assists in the removal of frictionally generated heat from the movable clutch plate 106.

Figure 4:
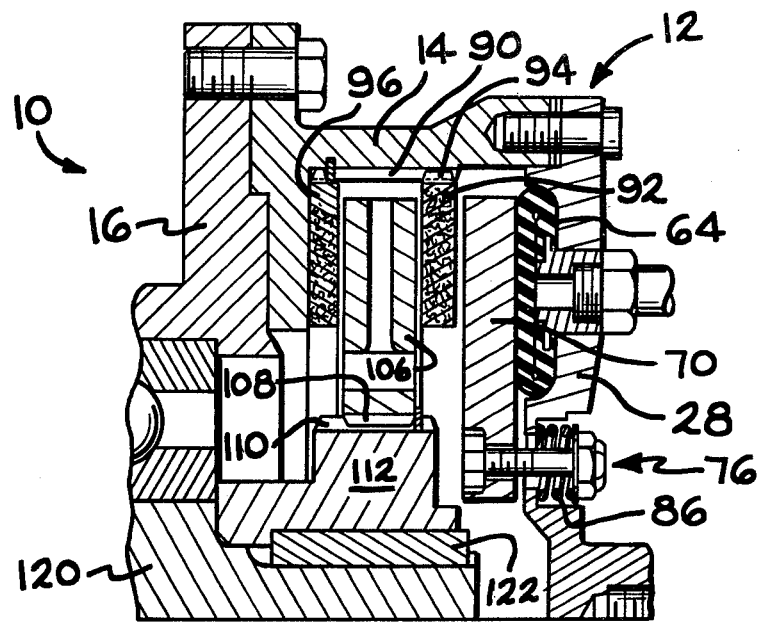
FIG. 4 is a fragmentary sectional view of a low drag clutch according to the instant invention in a deactivated state.

Referring now to FIG. 1 and particularly to FIG. 4, the deactivated state of the clutch mechanism 10 will first be described. In this state, the bladder 64 is collapsed due to the absence of significant air pressure and the compression springs 86 of the mounting assemblies 76 have retracted the ribbed pressure plate 70 to its relaxed position as illustrated in FIG. 4. The housing assembly 12 is typically the driven member in clutch mechanisms of this type and will therefore be appreciated that the housing assembly 12 and all the components of the clutch mechanism 10 attached thereto will be rotating with it. Similarly, the movable clutch plate 106, the hub 112 and the shaft 120 will typically function as the output members and they will either be stationary or rotating at some slower speed. Due to the separation of the first and second friction disks 92 and 96 from the adjacent face of the movable clutch plate 106, no power will be transferred through the clutch mechanism 10.

Figure 5:
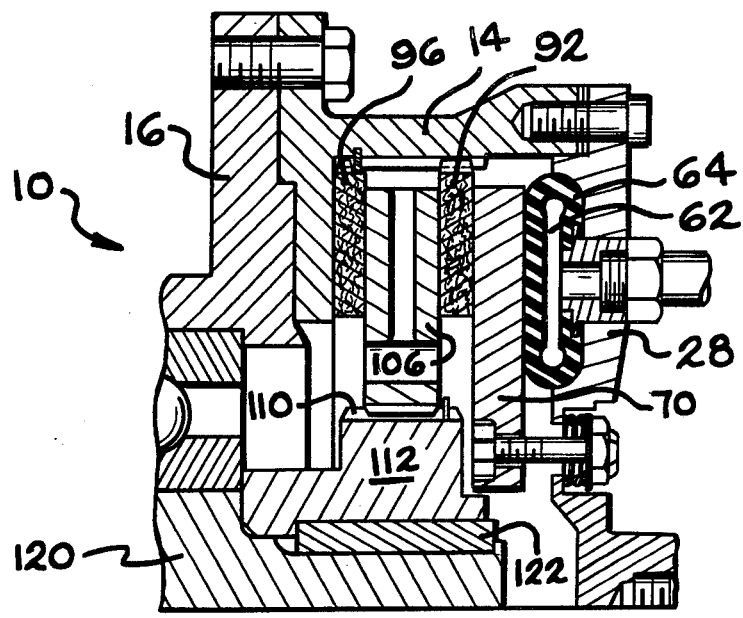
FIG. 5 is a fragmentary sectional view of a low drag clutch according to the instant invention in an activated state.

Referring now to FIG. 5, compressed air has been supplied to the bladder 64 and the ribbed pressure plate 70 has been urged axially to the left in FIG. 5, forcing the first friction disk 92 into contact with one face of the movable clutch plate 106 and subsequently forcing the movable clutch plate 106 into contact with the second friction disk 96. In this condition, power supplied to the housing assembly 12 through the flange drive member 24 is transferred through the elements of the clutch and out the shaft 120 in a substantially conventional fashion.

Referring again to FIG. 4, the pressure of the air within the bladder 64 has been relieved and the ribbed pressure plate 70, due to the bias of the compression springs 86, has returned to its deactivated position as illustrated in FIG. 4. The arrays of helical splines 90 and 94 and 108 and 110 now cooperate to fully separate and substantially eliminate drag by axially displacing the first friction disk 92 and the movable clutch plate 106 in response to small inertial and frictional forces. As deactivation of the clutch mechanism 10 occurs through the relaxation of the bladder 64 and retraction of the ribbed pressure plate 70, the speed of rotation of the shaft 120 will typically become less than that of the housing assembly 12 and specifically the fixed disks 92 and 96. In this operating condition, any contact between the movable clutch plate 106 and the second friction disk 96 will result in the arrays of helical spline 108 and 110 translating the movable clutch plate 106 away from the second friction disk 96. Similarly, any contact between the movable clutch plate 106 and the first friction disk 92 will result in the first friction disk 92 being translated axially away from the movable clutch plate 106, to the right, as viewed in all the drawing figures. Thus, contact between the friction disks 92 and 96 and the movable clutch plate 106 will tend to further separate these elements and eliminate or reduce to negligible levels, the mechanical coupling and thus drag between the flanged input member 24 and the output shaft 120. It has been found desirable to permit a maximum face-to-face separation between the movable clutch plate 106 and either of the first or second frictional disks 92 or 96 of about 0.060 to 0.090 inches maximum. These dimensions should be considered to be of an exemplary nature only and the exact maximum separation may be adjusted as necessary in response to various application and performance parameters.

It should, of course, be recognized that the sense of the splines 90, 94, 98, 108, and 110, that is, whether they are right hand or left hand, is both critical and determined by considerations of rotation. For example, let it first be assumed that the rotation of the housing assembly 12 is clockwise as viewed from the drive end, i.e., counterclockwise in FIG. 1. In this instance and given the fact that the shaft 120 and associated components slows when the clutch mechanism 10 is deactivated, all the sets of splines 90, 94, 98, 108 and 110 should be of right hand sense. Conversely, if the direction of drive is counterclockwise when viewed from the input end, i.e., clockwise when viewed in FIG. 1, the sets of splines 90, 94, 98, 108 and 110 should be of left hand sense as illustrated in FIG. 1. It should also be noted that if, for some peculiar application, the driven member such as the shaft 120 increases in speed when the clutch mechanism 10 is disengaged the foregoing rules for choice of spline sense should be reversed.

The foregoing disclosure is the best mode devised by the inventor for practicing this invention. It is apparent, however, that devices incorporating modifications and variations will be obvious to one skilled in the art of clutches. Inasmuch as the foregoing disclosure is intended to enable one skilled in the pertinent art to practice the instant invention, it should be construed to be limited thereby but should be construed to include such aforementioned obvious variations and be limited only by the spirit and scope of the following claims.

We claim:

1. A clutch for selectively transferring rotary energy comprising, in combination, a first rotatable member having an array of helical splines, a clutch plate having opposed friction surfaces disposed about said first rotatable member and having an array of helical splines complementary to and engaged by said array of helical splines on said first rotatable member, a second rotatable member having an array of helical splines, first friction means secured to said second rotatable member for engaging one of said two opposed friction surfaces, second friction means for engaging the outer of said two opposed friction surfaces having an array of helical splines complementary to and engaged by said array of helical splines on said second rotatable member, and means for selectively advancing said second friction means into frictional engagement with said clutch plate and said clutch plate into frictional engagement with said first friction means, wherey engaging said arrays of helical splines urge said second fricition means, said clutch plate and said first friction means into spaced apart relationship when said selective advancing means is deactivated.

2. The clutch of claim 1 wherein said second rotatable member defines a housing having an inner surface and said array of helical splines of said second rotatable member constitutes a portion of said inner surface.

3. The clutch of claim 1 wherein said means for selectively advancing said second means includes a pressure plate secured for rotation with said second rotatable member, a flexible bladder disposed adjacent said pressure plate, and spring means for advancing said pressure plate away from said second means toward said bladder.

4. The clutch of claim 1 wherein said first and said second friction means are substantially identical circular plates having helical splines disposed about their peripheries.

5. The clutch of claim 1 further including stop means for limiting the axial travel of said clutch plate on said first rotatable member.

6. The clutch of claim 1 wherein said first rotatable member is the output structure and second rotatable member is the input structure of such clutch.

7. The clutch of claim 1 wherein said clutch plate includes a first plurality of passageways extending through said clutch plate along parallel axes and a second plurality of passageways extending from a respective one of said first plurality of passageways radially outwardly to the periphery of said clutch plate.

8. A low drag clutch for selectively transferring rotary energy comprising, in combination, a rotatable housing member having an inner surface defining an array of helical splines, a first friction disk disposed generally within said housing member and having an array of helical splines complementary to and engaged by said array of helical splines of said housing member, a second friction disk disposed in fixed relationship to said housing member and spaced from said first friction disk, a rotatable shaft member disposed generally within said housing member and having an array of helical splines, a clutch plate having an array of helical splines complementary to and engaged by said array of splines of said shaft member and disposed generally between said first and said second friction disks, means for selectively translating said first friction disk into frictional engagement with said clutch plate and said clutch plate into frictional engagement with said second friction disk and spring means for translating said selectively translating means away from said first friction disk.

9. The low drag clutch of claim 8 wherein said rotatable housing defines an axis of rotation, said array of helical splines of said inner surface extend along said axis and said first friction disk, said second friction disk, said rotatable shaft member and said clutch plate are concentrically disposed about said axis.

10. The low drag clutch of claim 8 wherein said helical splines are all of left hand sense.

11. The low drag clutch of claim 8 wherein said helical splines are all of right hand sense.

12. The low drag clutch of claim 8 wherein said selectively translating means includes a pressure plate disposed generally adjacent said first friction disk and an expandable pneumatic chamber disposed between said pressure plate and said housing.

13. The low drag clutch at claim 8 further including stop means for limiting the travel of said clutch plate on said rotatable shaft member.

14. The low drag clutch of claim 8 wherein said second friction disk includes an array of helical splines complementary to and engaged by said array of splines of said housing member and further including means for fixedly retaining said second friction disk within said housing member.

* * * * *